United States Patent [19]

Heinz et al.

[11] 4,353,098
[45] Oct. 5, 1982

[54] METHOD OF STORING DIGITAL COLOR TELEVISION SIGNALS ON MAGNETIC TAPE

[75] Inventors: Richard Heinz, Pfungstadt; Reinhard Kutzner, Darmstadt, both of Fed. Rep. of Germany

[73] Assignee: Robert Bosch GmbH, Stuttgart, Fed. Rep. of Germany

[21] Appl. No.: 149,948

[22] Filed: May 15, 1980

[30] Foreign Application Priority Data

May 30, 1979 [DE] Fed. Rep. of Germany ....... 2921892

[51] Int. Cl.³ .............................................. H04N 5/79
[52] U.S. Cl. ......................................... 360/9.1; 360/8; 360/19.1; 360/33.1
[58] Field of Search ...................... 360/9, 8, 19, 32, 33; 358/4, 145, 147; 179/15.55 T

[56] References Cited

U.S. PATENT DOCUMENTS

| | | | |
|---|---|---|---|
| 3,446,914 | 5/1969 | Hodge | 360/19 |
| 3,789,137 | 1/1974 | Newell | 360/8 |
| 3,819,852 | 6/1974 | Wolf | 358/145 |
| 3,909,512 | 9/1975 | Omori | 360/8 |
| 3,921,132 | 11/1975 | Baldwin | 371/51 |
| 3,922,669 | 11/1975 | Baldwin | 340/347 DD |
| 4,063,290 | 12/1977 | Metildi | 360/9 |

FOREIGN PATENT DOCUMENTS 2342297 2/1974 Fed. Rep. of Germany ...... 340/347 DD

OTHER PUBLICATIONS

"Digital Sound & Television Recording", by Jones, IEEE Transactions on Magnetics, Mag-11, No. 5, Sep. 1975, pp. 1230–1233.
"Digital Television Recording", by Jones, Nov. 1973, BBC Research Report No. 1973/29.
"Digital Television Recording", by Baldwin, Jul. 1973, IERE Conference on Video and Data Recording, pp. 66–70.
International Broadcasting Convention Proceedings 1974, pp. 114–118, "An Experimental Approach to Digital Television Recording."
BBC Research Report No. 1969/42, "Possible Techniques for the Recording of Digital Television Signals", Oct. 1969.

Primary Examiner—Bernard Konick
Assistant Examiner—Alan Faber
Attorney, Agent, or Firm—Frishauf, Holtz, Goodman & Woodward

[57] ABSTRACT

The video and audio information is recorded along at least one track of the tape, which track, in the preferred embodiment of the invention, consists of discontinuous track segments oblique to the longitudinal axis of the tape, with portions of audio information alternating with portions of video information. At least the audio information is recorded in time compressed form.

13 Claims, 4 Drawing Figures

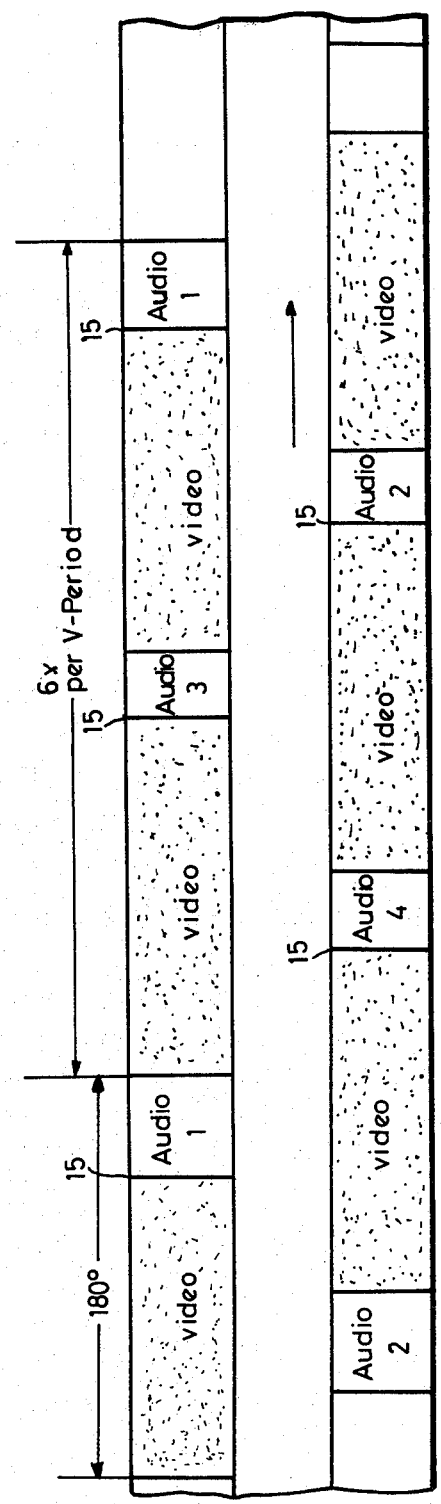
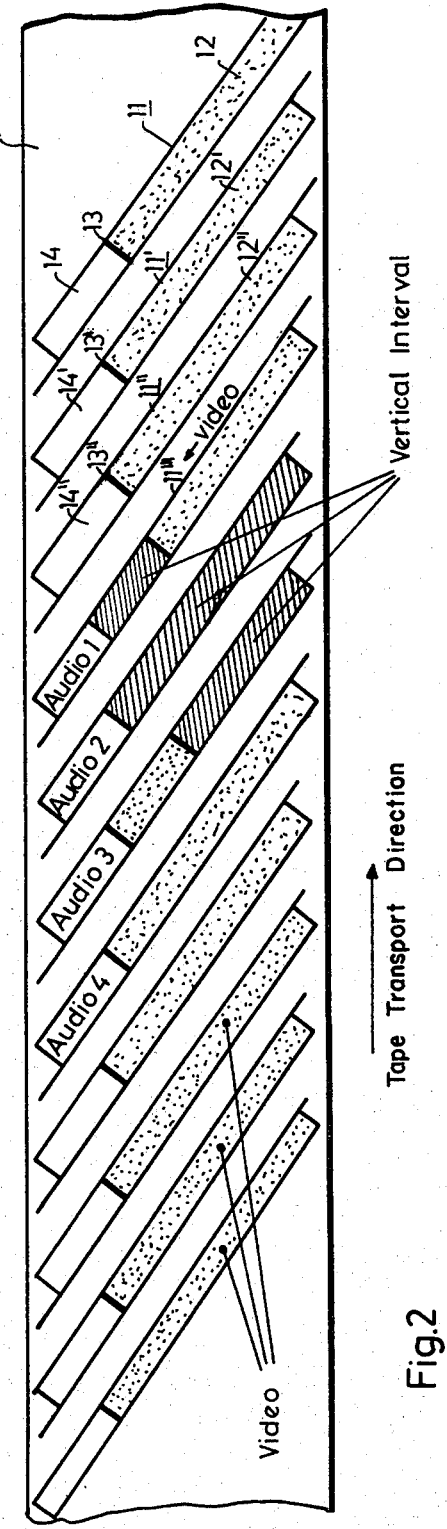
Fig.3
Fig.2

METHOD OF STORING DIGITAL COLOR TELEVISION SIGNALS ON MAGNETIC TAPE

The invention relates to a method of storing digital colour television signals on magnetic tape.

BACKGROUND

In German Patent Disclosure Document DE-OS No. 23 42 297, the disclosure of which is also contained in U.S. Pat. No. 3,922,669, Baldwin, there is disclosed a method for the production of a record carrier with digital signals, wherein these signals are applied to the record carrier in at least two separately and simultaneously readable recordings and, in at least one of the recordings, parity bits are recorded, which are derived from the bits of the other recordings or from at least one of the two recordings.

In the technique of magnetic storage of television signals, methods have come into general use wherein a magnetic tape is guided around a drum containing a rotating headwheel at the periphery of which are mounted one or more magnetic heads. For the purpose of storing or reading out the video signal, the magnetic tape is inscribed or scanned in a series of parallel track segments oblique to the direction of travel of the magnetic tape, whilst the associated audio signal is recorded in a longitudinal track parallel to the edge of the tape by a fixed magnetic head.

On account of the large frequency range of the colour television signal, a carrier frequency modulated by said signal is generated before the recording is carried out. Consequently values of amplitude are converted into frequency variations and these are recorded. Although, when being taken from a magnetic tape, frequency modulated signals are relatively insensitive to fluctuations of the spacing distance between the magnetic head or heads and the magnetic tape, in other words they are relatively insensitive to level fluctuations of the modulated carrier, they are, on the other hand, exceptionally sensitive to unwanted fluctuations in the frequency and phase of the carrier oscillation.

In the past numerous improvements have been made in magnetic tape equipment for the analog storage of colour television signals, with the result that nowadays a colour television transmission which derives from magnetic tape is, when broadcast, hardly recognisable as such by the eye of the inexperienced observer, and suffers little loss of quality as compared with a direct or live transmission.

The technique of electronic editing of magnetic tape recorded colour television signals inevitably leads to the situation that copies of portions of the magnetic tape must be prepared from which several "generations" of repeated copies are prepared. In general this copying is effected by transcribing, in many cases at high speed, from the parent to the copy tapes. It is apparent that this practice involves repeated transmission errors, principally errors in speed, which, finally after the demodulation of the signals, are perceptible in the reproduced picture and can no longer be removed. These errors multiply all the more quickly the higher is the density of storage of information upon the magnetic tape, that is to say the shorter are the wavelengths used in the recording.

In a similar way the audio signal, which is recorded on at least one longitudinal track of the magnetic tape, is affected by the multiplication of errors which become perceptible in the form of a worsening of the signal-to-noise ratio and volume fluctuations, as well as increase in the non-linear distortion and ripple effect in the frequency response.

Despite the small wavelengths used for audio recording in the longitudinal tracks in consequence of low tape speed, the storage density is unsatisfactory on account of the large width of the audio track and the necessity of providing safety zones between the audio track and the edge of the tape and those track segments which contain the video signal.

The increasing use of the so-called high density storage technique, which has the object of reducing the use of tape, has however resulted in the use of such small wavelengths, both in the video track segments which run transverse or diagonal to the edge of the tape, as well as in the longitudinal audio track or tracks, that an urgent need has grown for a recording system which will mitigate the existing problems.

The tendency towards computer controlled programme procedures, the relative insensitivity to deviations in phase and frequency of digital signals, and the development of digital picture stores or memories, make it apparent that the storage of digital signals derived from analog colour television signals is a suitable alternative to the analog recording technique.

Consequently numerous studies have been made in the past with the object of developing digital techniques for the magnetic storage of television signals:

BBC Research Report No. 1969/42, "Possible Techniques for the Recording of Digital Television Signals", October, 1969;

IERE Conference on Video and Data Recording, July 1973, pp. 66–70;

BBC Research Report No. 1973/29, "Digital Television Recording . . . ", November 1973;

International Broadcasting Convention Proceedings 1974, pp. 114–118, "An Experimental Approach to Digital Television Recording";

IEEE Transaction on Magnetic, Vol. MAG-11, No. 5, September 1975, pp. 1230 to 1233, "Digital Sound and Television Recording—The Requirement of the Signal".

A common feature of all of the publications known to the present applicant is that only slight attention has been paid to the storage of the audio signal accompanying the video signal.

THE INVENTION

Briefly, method is provided of storing a digital colour television signal, comprising video information and associated audio information, on magnetic tape, wherein both the video and audio information is recorded along inclined track segments of the tape with portions of audio information alternating with portions of video information, at least the audio information being recorded in time compressed form.

The invention has the advantage that in principle the audio information of the colour television signal is recorded upon and read out from the magnetic tape in a similar manner to that used for the video information. It is therefore possible essentially to make use of the same processing channels for the picture signals and the audio signals. Likewise these signals are subject to similar fault influences so that methods of fault detection, suppression and/or removal can be almost uniformly applied.

It is to be regarded as a further advantage that storage densities similar to those applying to the video information can be achieved when storing the audio information.

In the preferred embodiment of the invention it is of particular advantage that the recorded audio information can be edited and processed by electronic cutting equipment.

BRIEF DESCRIPTION OF THE DRAWINGS

An embodiment of the invention will now be described, by way of example, with reference to the accompanying drawings, in which:

FIG. 2 is a schematic diagram of the arrangement of the video and audio information on a magnetic tape produced according to the preferred embodiment of the invention;

FIG. 3 is a timing diagram; and

DESCRIPTION OF PREFERRED EMBODIMENT

Figure 1:
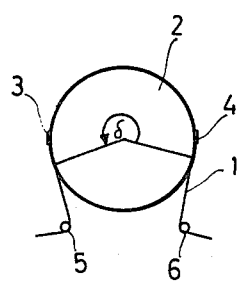
FIG. 1 is a simplified schematic diagram of the basic elements of a signal storage device which may be used in performing a preferred embodiment of the invention.

FIG. 1 shows the path taken by a magnetic tape 1 around a stationary or rotatable guide drum or cylinder 2. A headwheel (not shown) rotates in a transverse gap of the guide cylinder 2 and carries at its periphery two magnetic heads 3, 4 which occupy diametrically opposite positions. The angle of loop $\delta$ of the tape 1 about the cylinder 2 is so selected that each magnetic head contacts the tape before the other head leaves the tape so as to ensure continuity of recording. Guide rollers 5, 6 guide the magnetic tape helically around the cylinder 2 so that whilst the tape is in uniform motion information is recorded upon the magnetic tape by the magnetic heads 3, 4 in a series of parallel track segments oblique to the edge of the tape. The signal storage device of FIG. 1 is of a generally known type and does not require further description here.

In the schematic track diagram of FIG. 2, which illustrates the arrangement of the video and audio information in a preferred embodiment of the invention, parallel track segments 11, 11', 11'' are recorded upon the magnetic tape 1 by the magnetic heads 4, 3. Some of the track segments contain multi-line sections of video information 12, 12', 12'' recorded in digital form over the portion of their length, these sections of video information being separated, by a track portion 13, 13', 13'' devoid of information, from following sections of audio information 14, 14', 14'' likewise recorded in digital form. Preferably the same coding is selected both for the video information as well as for the audio information. This is of particular advantage because it allows the same circuit elements to be used for the coding and decoding.

The digitally stored audio information at the end of a track segment is recorded or read out subsequent to the video information in the same track segment, but the content of the audio information is related to the video information and, during the reproduction, must again be made available in parallel to the video information.

The time scale diagram (FIG. 3) shows that, with the previously described scanning configuration wherein each head engages the tape before the other head leaves the tape, audio information in digital form is recorded at the end of a track segment whilst simultaneously the recording of video information in digital coded form is started in the succeeding track segment. In this arrangement the storage of the video information content of a plurality of television lines and, following this, the related audio information, always occupies the same time period, i.e. that during which a magnetic head situated at the periphery of the headwheel is in contact with the magnetic tape.

The sections of audio information are thus time compressed and delayed in such a manner that the audio information follows the digitally recorded video information sections whilst maintaining a predetermined spacing therefrom. Because the audio information in time compressed form occupies only a fraction of the storage space required by the associated video information, it is possible to record, at the end of a first track segment, the audio information of a first transmission channel, to record at the end of a second track segment the audio information of a second channel, at the end of a third track segment the audio information of a third transmission channel, and so on.

The manner in which the space is gained in each track segment for the introduction of the audio component following the video component is either to increase the looping angle of $\delta$ (FIG. 1) of the magnetic tape around the guide cylinder 2 to such an extent that the audio information, in a time compressed and time delayed form, can be recorded in the extended length of the track segment so obtained, or to subject the video information also to a time compression operation, so that the free space in the track segment gained thereby is used for recording the similarly time compressed audio information.

Television signals in analog form include, besides the video information, a series of synchronizing signals for ensuring the synchronism between individual signal sources or between the latter and the receivers. These synchronizing signals (horizontal and vertical synchronizing signals) demand, in analog recording, an amount of storage space on the magnetic tape corresponding to their time duration. However, for the reproduction of digitally recorded television signals the transmission of the synchronizing signals is not necessary because the position of the individual picture elements derives from their addresses and not from their relationship in time.

Therefore it is possible to introduce audio information in a time compressed form also into empty portions of the track segments previously occupied by the synchronizing signals. Although the storage of audio information in the H gaps (while possible) encounters difficulties on account of the short time period available, in particular because of the editorial processing of the audio signal, on the other hand the V gaps offer, on account of their very much longer time period, the possibility of maintaining a complete track segment devoid of video information between one or more track segments which represent the content of a field or frame. This storage area can be adopted with advantage for the storage of audio signals. It is also possible to introduce into this track segment further audio information (audio commentary). The V gaps can also be used for the recording of audio information even if the synchronizing signals are retained, the audio information being placed between such signals.

Figure 4:
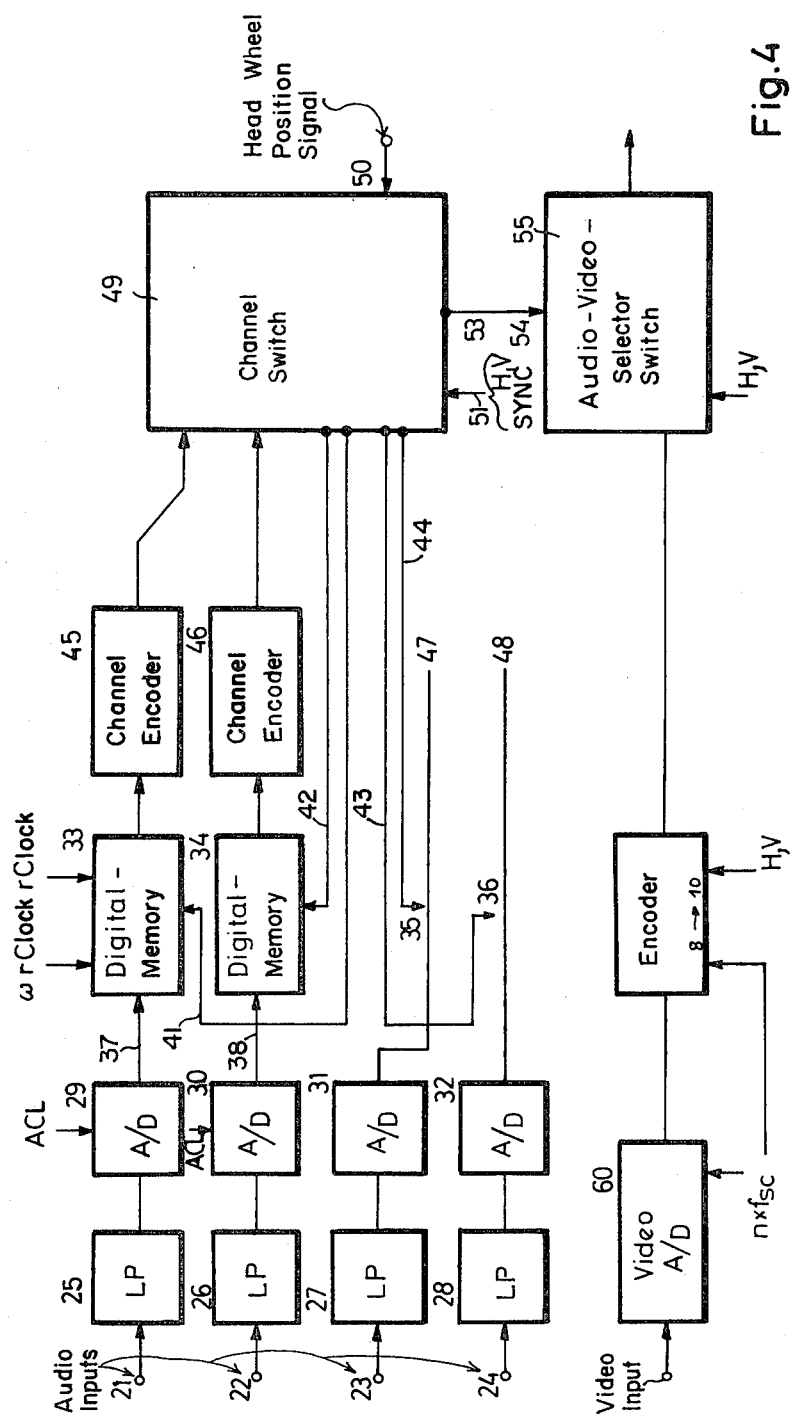
FIG. 4 is a block schematic diagram of a circuit arrangement for use in conjunction with the storage device of FIG. 1 for performing the preferred embodiment of the invention.

In FIG. 4 there are four independent audio channels feeding inputs 21, 22, 23, 24. After passing through respective lowpass filters 25, 26, 27, 28, in which high frequency disturbance components are filtered out, the audio information is passed to respective analog-digital converters 29, 30, 31, 32. At this point the information is quantized from its original analog form into a 16 bit data format. From the output of the A/D converters the 16 bit quantized information is delivered to respective digital stores or memories 33, 34, 35, 36. The digital stores have pulse input terminals 37, 38 . . . for reading-in and pulse terminals 41, 42, 43, 44 for reading-out. By suitable timing of these pulses the audio information read out is subjected to a time compression and converted from the 16 bit format into an 8+8 bit format to suit the requirements of the video channel which operates on an 8 bit format.

The output of each digital store is connected in each case to an input of a respective channel coder 45, 46, 47, 48, which modulates the 8+8 bit format into a code. From this point the information passes to a channel switch 49 for selecting the information from one of the audio channels for recording. This particular channel selected at any instant is dependent upon the position of the headwheel, which position is detected by a headwheel position detector (not shown in the drawing) which conveys a headwheel position signal to an input 50. The selective switching of the individual audio channels is, moreover, effected in dependence upon the presence of the horizontal and vertical synchronizing signals, which are applied at the input 51 of the channel switch 49. The output 53 of the channel switch 49 is connected to the audio input 54 of an audio/video selector switch 55 whose output supplies the signals for recording by the device of FIG. 1, the switch 55 being programmed to supply video and audio information to the magnetic heads 3 and 4 in accordance with the sequence necessary to provide a desired track arrangement, such as that shown in FIG. 2. Thus, in the event of the recording of both audio and video information in each track segment, the switching operation video to audio takes place in the audio-video selector switch 55 at the appropriate time during the recording of each track segment. In this case the video signal is time-compressed and coded in a similar manner to the audio signal. The video signal is therefore first quantized in an 8 bit format in an A/D converter 60, is time compressed and simultaneously converted into a 10 bit format.

It is to be observed that the invention is not restricted to the practical example shown in the drawing and described in the specification. In particular it is possible to place the section of audio information not only at the end of the track segment after the video information but at any suitable position, for example, at the start of the track segment. Moreover it is possible to record a plurality of sections of audio information, derived from various audio channels, in one and the same track segment after being subjected to suitable time compression and time displacement, for example by placing one section of audio information at the beginning of the track segment before the video information and a further section of audio information at the end of the track segment after the video information. It is also possible to record successive sections of audio information in alternate track segments, whereby track segments devoted exclusively to video information alternate with track segments devoted exclusively to audio information. All these various alternatives may be achieved by a suitable control of the switches 49 and 55 of the circuit arrangement of FIG. 4, together with a suitable degree of compression and delay of the audio and video information. In all cases it is to be noted that, regarding the successive track segments as discontinuous parts of a common recording track, portions of audio information alternate with portions of video information.

The invention is also applicable to recording devices of the type where a tape moves at high speed past a fixed head to give a continuous longitudinal recording track.

We claim:

1. A method of storing a digital color television signal on magnetic tape, in which the signal includes video information signals and associated audio information signals, comprising guiding the tape helically around a headwheel;

recording the color television signal by at least one magnetic recording head disposed on the periphery of the rotatable headwheel to form a recording track which has a plurality of discontinuous substantially parallel track segments extending at an angle with respect to the longitudinal direction of the tape;

wherein the recording step comprises recording at least portions of audio information signals alternating with at least portions of video information signals on said track segments extending at an angle to the longitudinal direction of the tape, at least some of the track segments containing a section of the audio information signals recorded at a predetermined position on the track segment adjacent a section of the video information;

and wherein at least the audio information is recorded in time compressed form.

2. A method as claimed in claim 1, wherein the video information is also recorded in time compressed form.

3. A method as claimed in claim 1, wherein the audio and video informaton is recorded by means of a common recording device.

4. A method as claimed in claim 1, wherein certain of the track segments contain a plurality of sections of audio information together with at least one section of video information.

5. A method as claimed in claim 4, wherein certain of the track segments contain two sections of audio information recorded respectively at the beginning and the end of a section of video information.

6. A method as claimed in claim 1, wherein successive sections of audio information are recorded in alternate track segments.

7. A method as claimed in claim 1, wherein audio information is recorded during vertical blanking gaps of the video information.

8. A method as claimed in claim 1, wherein audio information is recorded during horizontal blanking gaps of the video information.

9. A method as claimed in claim 1, including the step of digitizing the audio information to form digital audio signals;

and the step of processing the digital audio signals to have the same data format as that of the video signals and to provide the audio signals divided into blocks of equal bit number, wherein n blocks of audio data correspond in bit number to m blocks of video data.

10. A method as claimed in claim 9, wherein the blocks of audio data contain auxiliary information.

11. A method as claimed in claim 1, including the step of intermediately storing the video information signal and reading out the video information signal in time delayed form so that the time displacement between the picture signal and the audio signal is removed.

12. A method as claimed in claim 1, wherein the track segments contain a section of audio information signals recorded at the beginning of the track segment, followed by a section of video information.

13. A method as claimed in claim 1, wherein the track segments contain a section of audio information recorded at the end of the track segment after a section of video information signals.

* * * * *